July 14, 1925.
W. G. DOTY
BAIL HANDLE
Filed Feb. 6, 1923
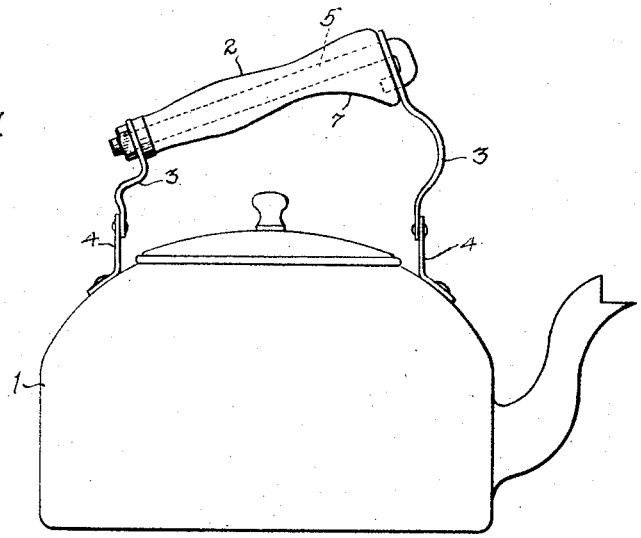
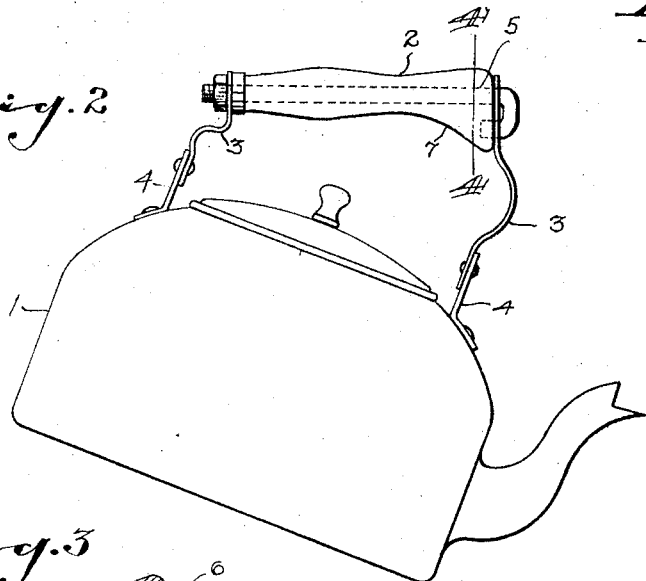
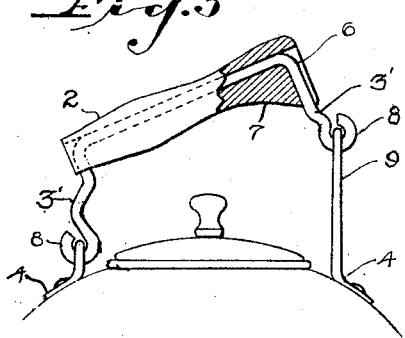
Inventor
Walter G Doty
By F. L. Walker
Attorney Patented July 14, 1925.

1,545,488

UNITED STATES PATENT OFFICE.

WALTER G. DOTY, OF DAYTON, OHIO.

BAIL HANDLE.

Application filed February 6, 1923. Serial No. 617,280.

*To all whom it may concern:*

Be it known that I, WALTER G. DOTY, a citizen of the United States, residing at Dayton, in the county of Montgomery and State of Ohio, have invented certain new and useful Improvements in Bail Handles, of which the following is a specification.

My invention relates to pouring vessels and more particularly to a bail handle so constituted and arranged as to permit the handle grip of the bail to be grasped in a natural position of the operator's hand and the pouring operation to be effected without distortion or straining of the hand into an awkward or uncomfortable position.

Bail vessels have usually been provided with a handle grip so arranged as to be normally at right angles to the perpendicular or parallel with the bottom of the vessel. In pouring from such a vessel the handle grip must be tilted beyond a horizontal position necessitating an unnatural inconvenient and uncomfortable position of the operator's hand which seriously interfers with the security of his grasp and the control of the vessel during the pouring operation.

The present invention involves the arrangement of a bail handle with its handle grip inclined downwardly and rearwardly in relation with the pouring spout, in which position it may be naturally and conveniently grasped and from which position it is turned to a substantially horizontal position during the pouring operation. This tilting movement and turning of the hand is much more easily effected from an inclined position above the horizontal toward or slightly beyond horizontal position, than it is from the usual horizontal position to an inclined position far beneath the horizontal. This inclination of the handle grip may be effected by making the bail arms of unequal length or by extending one of the ears or bail connections to a greater height than the other. The invention further involves a peculiar formation of the handle grip, which is enlarged at one end, and the fixed connection of a carrier member extending through the handle grip to prevent relative rotation.

The object of the invention is to provide a bail handle which may be grasped with a natural position of the hand and which will not necessitate distortion or straining of the operator's hand into an unnatural position in order to pour from the vessel and which will further enable the operator to maintain more secure and safe control of the vessel during pouring operation.

A further object of the invention is to provide an improved form of handle grip and an improved method of mounting the handle grip for non-revoluble relation with a carrier bail.

With the above primary and other incidental objects in view as will more fully appear in the specification, the invention consists of the features of construction, the parts and combinations thereof and the mode of operation or their equivalents as hereinafter described and set forth in the claims.

Referring to the accompanying drawings, wherein is shown the preferred, but obviously not necessarily the only form of embodiment of the invention, Fig. 1 is a side elevation of tea kettle to which the improved form of bail handle has been applied. Fig. 2 is a similar view of the tea kettle in pouring position, showing by comparison with Fig. 1 the relative movement of the bail handle within a natural and comfortable range of movement of the operator's hand. Fig. 3 is a detail view partly in section illustrating two modifications, first, one in which the attachment ears upon the vessel are of unequal length, in lieu of making the bail arms of unequal length, and second, a modified method of attaching the carrier member with the handle grip to hold the same against relative revoluble movement.

Fig. 4 is a detail transverse sectional view of the bail handle, on line 4—4 of Fig. 2.

Like parts are indicated by similar characters of reference throughout the several views.

In the drawings, 1 is the vessel, which in the present instance has been illustrated as a tea kettle, but which may be of any other type to be equipped with a bail handle. Mounted upon the vessel or kettle 1 is a bail handle comprising the inclined handle grip 2, from each end of which extends dependent bail arms 3—3, operatively connected with attachment ears 4—4 upon the vessel or kettle. The bail arms 3 may be metal straps, or thin flat strips as shown in Figs. 1 and 2, or they may be round stock or heavy wire as shown at 3′ in Fig. 3. The handle grip 2, is preferably though not necessarily of wood or other non-conductor of heat. The handle grip is arranged in an inclined position in substantial alinement with the pouring spout of the vessel or kettle with its forward end or that adjacent the spout elevated to a considerable extent above the level of its opposite or rear end.

A tea kettle or similar vessel is usually supported in an elevated position upon a stove or other support so that under ordinary circumstances the operator must raise his hand to grasp the bail handle. When grasping an article in an elevated position, one does not naturally nor conveniently turn the hand to a horizontal position as is necessary in grasping the ordinary bail handle, but to the contrary the natural position when the hand is elevated is an upwardly inclined position with the thumb uppermost. The inclination of the present handle grip 2 is such as to conform substantially to this natural position of the hand. The natural range of adjustment of the hand when in such elevated position as it would usually be in pouring from a vessel is from an upwardly inclined position to a substantially horizontal position. To turn the hand beyond such horizontal position in a pouring operation is an unnatural position and strained movement. By inclining the handle grip 2 as shown in the drawing, one is enabled to grasp the handle grip naturally and to effect the pouring operation by the most natural and convenient range of movement of the hand toward a horizontal position of the handle grip as shown in Fig. 2. Moreover, the shape of the handle grip is such as to readily enable the operator to control the vessel by grasping the grip 2 with the fingers and placing the thumb 2 on the upper forward end of the grip 2 which is peculiarly shaped for this purpose.

At its forward end the handle grip is enlarged in the plane of the bail to form a somewhat triangular head upon the forward end of the handle grip. The handle grip 2 is provided with a longitudinal bore through which extends a rod 5, engaged at its opposite ends with bail arms 3. In the construction shown in Figs. 1 and 2 this carrier rod 5 extends through a perforation in the rear bail arm 3, and is provided with a nut or head beyond such bail arm. At its forward and upper end the carrier rod 5 extends through the opposite bail arm 3 and is then bent laterally and reengaged with the broadened head of the handle grip 2 by having its end thrust through a suitable second perforation in the bail arm 3 and into the end of the handle grip to prevent relative rotation of the parts. In lieu of this construction the carrier rod may be bent laterally as shown at 6 in Fig. 3, such lateral extension being seated in a grooved recess in the end of the handle grip 2 for such purpose.

In lieu of the bail straps 3—3 of Figs. 1 and 2, the opposite ends of the carrier rods 5 may be extended as at 3' in Fig. 3, and provided with eyes 8 at their extremities for engagement with the supporting lugs or ears 4—4. These extensions may be of unequal length as are the bail arms 3 of Figs. 1 and 2. However, in lieu of making the bail arms of unequal length, the attachment ears 4—4 may be of unequal extent, the forward attachment ear being extended to a considerable height above the rear ear as shown at 9 in Fig. 3.

The broadening of the forward end of the handle grip 2 gives to the forward portion of the under edge of the grip a substantially horizontal contour as at 9, which facilitates the carrying of the vessel in the usual manner. Such substantially horizontal portion of the under edge of the grip fits the hand when in carrying position conveniently and comfortably as does the remaining inclined portion of the grip when pouring or when lifting the vessel from place to place. This grip therefore combines the advantages of an inclined handle grip and a horizontal grip in a single device, and renders the bail universal in its adaptation for all conditions of use.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein disclosed comprises the preferred form of several modes of putting the invention into effect and the invention is therefore claimed in any of its forms or modifications within the legitimate and valid scope of the appended claims.

Having thus described my invention, I claim:

1. A tea kettle or the like having a swinging bail, one leg of which is longer than the other, and a handle grip mounted upon the bail in inclined relation to the bottom of the kettle, said handle grip having top and bottom margins which are divergently extended with relation to each other at the end toward the pouring spout, whereby said handle grip will normally be inclined to the vertical and will be advanced from such inclined position toward a horizontal position during the operation of pouring from the vessel.

2. A vessel having a bail handle including a hand grip normally inclined to the vertical and tending to approach a horizontal position as the vessel is tipped for pouring purposes, the forward end of the handle grip being of increased depth, the top surface of the grip being continued at approximately the general inclination of the handle grip, while the under surface thereof is deflected downwardly to afford a convenient hand grasp when the vessel is in a normal upright position.

3. A vessel having a pouring spout, a handle member of substantially ovate cross-sectional form at the end toward the pouring spout, said handle member being supported over the vessel, substantially in alinement with the pouring spout and normally in inclined relation with the horizontal, with its forward, ovate end nearest the pouring spout inclined upwardly.

4. The combination with a vessel, of a handle grip of dual directional form and unequal connections between the opposite ends of the handle grip and the vessel, one portion of the handle grip being maintained in nonparallel and the other portion in approximately parallel relation with the normal liquid level of the vessel whether the vessel be upright or tilted.

5. A bail handle for a vessel including a handle grip of dual directional form, a portion of which normally extends substantially horizontally while the remainder of the grip extends at an inclination to the horizontal, with the end toward the pouring spout elevated above the opposite end of the handle grip, the handle thus being rendered universally convenient for both carrying and pouring operations.

6. In a tea kettle or the like, a swinging bail, one connecting portion of which is longer than the other and a handle grip of curvilinear form mounted upon the bail with the end of the grip toward the pouring spout elevated above the opposite end of the grip, the under surface of the handle grip meeting the respective legs of the bail at different angles.

7. The combination with a tea kettle or the like, having a bail handle, of a handle grip for said bail, the under surface of which is duo-directional with the rear portion thereof, extending at an inclination to the base of the kettle, and the forward portion thereof extending approximately parallel with the base of the kettle whereby whether held in normal or tilted position one or the other portions of the handle will be approximately horizontal.

8. The combination with a tea kettle or the like, having a bail handle, of a duo-directional handle grip for the bail succeeding portions of which extend in angular relation with one part approximately horizontal and the other part inclined to the horizontal whether the kettle is held in normal position or in a tilted position for pouring.

In testimony whereof, I have hereunto set my hand this 1st day of February A. D. 1923.

WALTER G. DOTY.

Witnesses:
HARRY F. NOLAN,
GEORGE C. HELMIG.